United States Patent [19]

Giovagnoni

[11] 4,130,732
[45] Dec. 19, 1978

[54] REMOTE ALARM RESET APPARATUS

[76] Inventor: George Giovagnoni, 1228 Wantagh Ave., Wantagh, N.Y. 11793

[21] Appl. No.: 796,326

[22] Filed: May 12, 1977

[51] Int. Cl.$^2$ .................. G08B 19/00; H04Q 9/00
[52] U.S. Cl. .................. 179/5 R; 179/2 A; 340/506
[58] Field of Search .......... 179/5 R, 5 P, 2 A; 340/409, 213.2

[56] References Cited

U.S. PATENT DOCUMENTS

| 4,021,796 | 5/1977 | Fawcett, Jr. et al. | 340/409 |
| 4,023,139 | 5/1977 | Samburg | 179/2 A |

FOREIGN PATENT DOCUMENTS 1343819  1/1974  United Kingdom .................. 340/409

Primary Examiner—Kathleen H. Claffy
Assistant Examiner—Kenneth A. Chayt
Attorney, Agent, or Firm—Robert D. Farkas

[57] ABSTRACT

Apparatus utilizing conventional telephone lines to transmit a coded tone to a resetting apparatus installed in combination with a burglar alarm. The alarm system includes a plurality of series circuited switches utilized to maintain an alarm relay in an energized condition, when properly set to detect entry by unauthorized personnel at building openings, or other locations, each utilizing one of the series circuited switches. The instant invention responds to an incoming telephone ringing signal so as to simulate a timed pick-up of the switch hook of the telephone only when one or more of the series building opening entry detecting switches have been operated into an open position or upon an equipment failure which activates the alarm device de-energizing the alarm relay. Upon receipt of a pre-determined coded tone, or series of tones, a tone detecting apparatus feeds a four in-put nand gate, preparing a circuit path for the reclosure of the alarm relay. A logic circuit is used to select the open alarm switch so as to simulate its closure. The alarm relay is restored to its energized condition preventing the apparatus from automatically responding to a second incoming call thereto unless another equipment breakdown or alarm switch circuit opening occurs.

7 Claims, 1 Drawing Figure

REMOTE ALARM RESET APPARATUS

BACKGROUND OF THE INVENTION

1. Field of the Invention

This invention relates to alarm resetting apparatus and more particularly to that class utilizing remotely generated coded tones to selectively re-institute the alarm apparatus into a working condition by shorting a portion of the alarm circuit found to be open circuited.

2. Description of the Prior Art

The prior art abounds with apparatus remotely controlled by utilizing telephone lines. U.S. Pat. No. 3,876,836 issued on Apr. 8, 1975 to M. J. Langan is one such disclosure. Telephone ringing at a remote location is monitored. Counters register one or two rings, as desired. The first ring sets up a gate-inhibiting period and the second ring extends that period. A count of one is applied to means for energizing an outlet or turning on an appliance. The counters are reset at the end of the gate-inhibiting period, as originally established or extended. Supplemental resetting means becomes effective so as to render the system nonresponsive to rings in excess of two. This apparatus utilizes the ringing tones of the telephone to operate the appliance circuit.

U.S. Pat. No. 3,783,193 issued on Jan. 1, 1974 to M. L. Lee discloses an apparatus for the activation of a remotely located device under the control of telephone subscriber lines and stations. The apparatus is located in the vicinity of a called telephone subscriber station and is operated to activate a remotely located device through two series of ringing signals initiated by a calling telephone subscriber station and produced by the called telephone subscriber station. The first series of ringing signals activates a timer which resets a counter that controls the operation of the remotely located device providing the counter is not on a preselected code position. The timer disables the counter from receiving counting pulses during the first series of ringing signals. In addition thereto, the timer enables the counter to receive the counting pulses during a period $P_2$ and be a preselected number of ringing signals, the counter will then activate the remotely located device. The Lee Patent is similar in overall function to the Langan Patent.

U.S. Pat. No. 3,400,219 issued on Sept. 3, 1968 to K. U. Jahns et al teaches a remote control system responsive to direct current potentials of different amplitudes and polarities on wire line, and including a plurality of control devices responsive to alternating current signals. The potential on the wire line is applied to the gates to overcome the reverse bias thereon so that the alternating current signals actuate the control devices. Here, injected signals, provided by the oscillator, are utilized to control the actuation of the control devices.

All of the aforementioned patents fail to provide a telephone ringing signal responsive device sensitive to a preset electrical circuit status within the "called" equipment, which in turn enables a successfully completed incoming call during which external coded tones are transmitted, to re-alter the electrical circuits status by automatically determining and modifying the internal circuitry of the called apparatus.

SUMMARY OF THE INVENTION

A primary object of the present invention is to provide a remote alarm reset apparatus which automatically responds to coded tones, induced from a remote location, to reset a burglar alarm.

Another object of the present invention is to provide an apparatus which will respond to incoming telephone calls only when an alarm apparatus has been tripped.

Still another object of the present invention is to provide an apparatus, which when activated by signals emanating from a remote source, seeks and bridges open circuited portions of a burglar alarm series circuit which is installed to protect structure openings and walkways.

Yet another object of the present invention is to provide an apparatus capable of automatically resetting a burglar alarm into an energized operating condition after locating and curing internal open circuited conditions.

A further object of the present invention is to provide an apparatus which effectively signals a telephone caller that the burglar alarm associated therewith is operable and in a state of readiness to be triggered into an alarm condition.

Heretofore, burglar alarms, when triggered by the activity of unauthorized personnel, or, when triggered by a switch failure amongst the many switches and foil strips acting as switches utilized in conventional burglar alarm systems, required the presence of an authorized person to locate the fault, and after repairing the fault, sometimes being nothing more than a switch momentarily jarred into the open position by the forces due to wind or vibration, to reset the alarm relay, in an effort to obtain alarm protection. These resetting procedures often times occur at night and represent a substantial inconvenience to proprietors and operating personnel of business establishments who reside at some distance from the site of the premises protected by the burglar alarm. The primary purpose of the present invention is to enable authorized personnel to place a telephone call, upon being notified of an alarm condition of the burglar alarm, so as to automatically locate the faulted portions of the alarm sensing circuit, curing such faulted portions by a process of shorting them out, and resetting the alarm. Coded tones are required to accomplish this purpose, thereby eliminating the ability of an unauthorized telephone caller to reset the alarm. Furthermore, the same apparatus may be used to signal, upon a recall, the effective reestablishment of the burglar alarm into an operable position. Authorized personnel may, through the use of the present invention, verify at will the effective detecting condition of the burglar alarm, even though they are unaware of the previous triggering or alarm signalling condition thereof. Thus, the nagging doubts oft times occurring after closing down the "protected" premises for the night that the burglar alarm was not turned on, can be resolved by the simple process of placing a telephone call.

The instant invention because of internal connections to each switch element, in the series circuit of the burglar alarm comprising the detecting portion of the alarm circuit, also provides the location of a fault by a visual signalling apparatus, so that authorized personnel, when on the scene, may readily discern which portions of the alarm sensing circuit are either malfunctioning or were triggered into operation by unauthorized personnel. Such visual signalling apparatus, located within the guarded premises, serves the additional function to permitting police or security guards to determine the point of entry, thereby aiding in the capture of burglars and the like.

Since many burglar alarms are equipped with automatic telephone dialing and audible signalling equipment, speedy notification of an alarm tripping occurrence is accomplished. When the alarm is reset, utilizing the present invention, within a short period of time after the entry of unauthorized personnel into the premises, attempts by the burglar to leave the premises through another guarded zone, now protected by the alarm sensing system, causes the alarm to be reactivated, thereby acting as an aid in alerting law enforcement personnel as to the whereabouts of the burglar.

These objects as well as other objects of the present invention, will become more readily apparent after reading the following description of the accompanying drawings.

BRIEF DESCRIPTION OF THE DRAWING

The drawing is a block diagram of the instant invention illustrating the functional use of the electronic components contained therein.

DESCRIPTION OF THE PREFERRED EMBODIMENT

Figure 1:
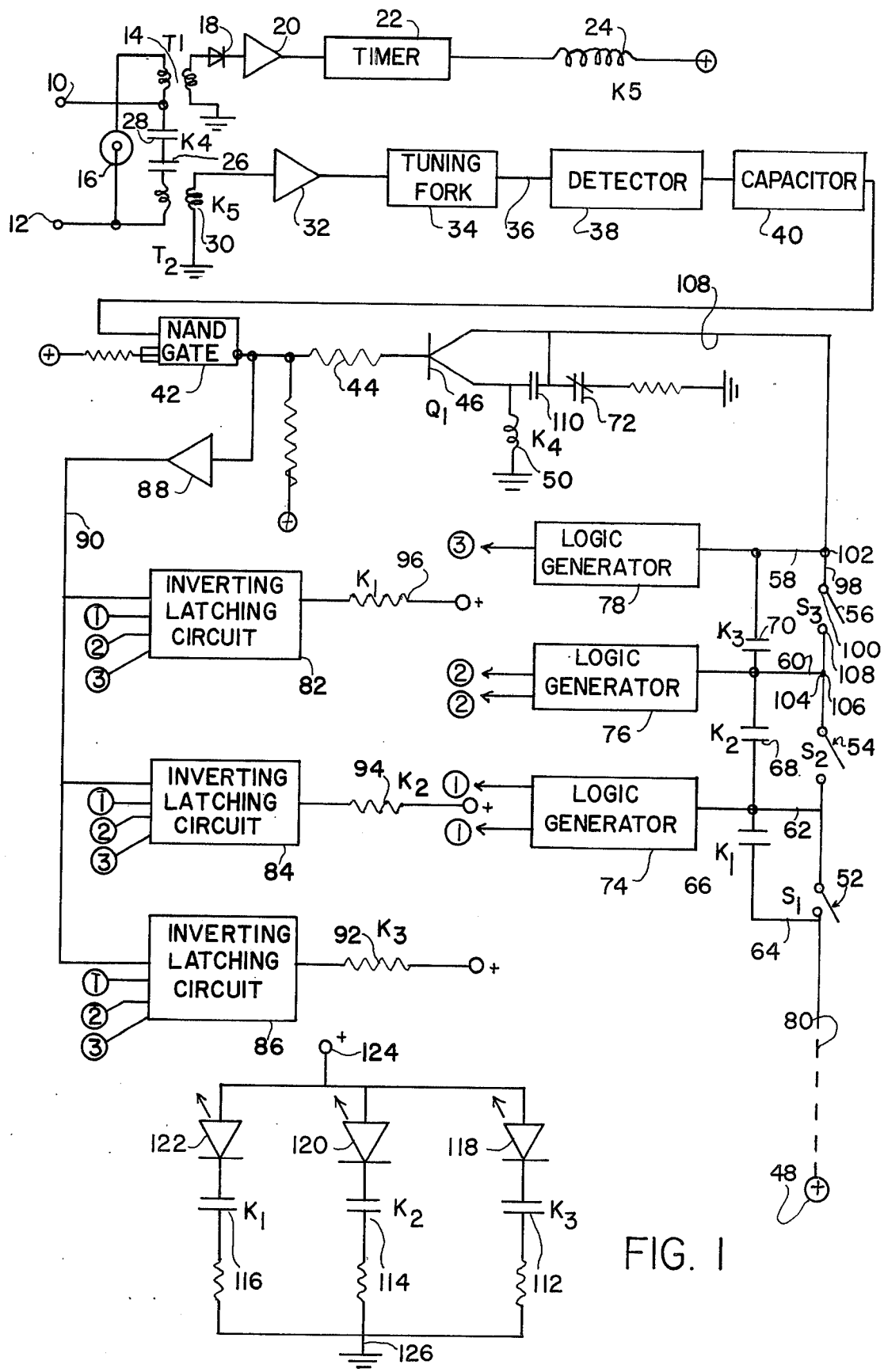

The structure and method of fabrication of the present invention is applicable to a conventional burglar alarm having a string of switch or tape sensing elements arranged in a series circuit, in series with a power supply, a coil of an alarm relay, and a normally open contact of the alarm relay. The burglar alarm device, upon the condition that all the series circuit switch or tape elements, used to sense the opening of doors, breaking of windows, breaking of photoelectric beams, etc., and upon the momentary shorting out of the normally open relay contact, enables the coil of the relay to be "locked -up" to the power supply for an indefinite period, terminated only by the failure of the power supply or the opening of any portion of the series sensing circuit comprising the switch or tape elements therein. Auxiliary contacts of the relay are utilized to energize alarm devices including bells, sirens, lights, and automatic telephone dialing equipment. The instant invention utilizes a plurality of wires running from each discrete switch or tape element, or series groups thereof, to normally open relay contacts, which when closed, successfully bridges those elements or groups of series elements having an open circuited condition. Each switch closure relay is energized by operating a nand gate of a latching circuit upon the request of a logic generator used to detect which switch element is in an open circuited condition. There is one logic generator for each bridging path providing an output, feeding to the nand gates of the latching circuits. The logic generators may be triggered into operation only upon the presence of a coded tone, or a series of coded tones, received over a telephone line. The telephone lines, comprising a tip line and a ring line, are connected to a first and second transformer, used for 110 volt line isolation purposes. Additionally, the first transformer is utilized to couple 20 $H_z$ ring generator signals into a 20 $H_z$ ring up amplifier. The second transformer is used for decoder tone coupling into a tone amplifier. Upon telephone line seizure, the 20 $H_z$ ringing voltage, whose amplitude is in the range of 50 to 100 volts R.M.S., is applied across the primary winding of the first transformer by way of the ring side of the line, through a neon gas filled discharge tube, through a pair of normally closed contacts of the alarm relay, through the first transformer primary, and back to the tip side of the line. The alarm relay contact will only be in the closed condition because of an alarm failure or an otherwise caused de-energizing of the coil of the alarm relay. The ring voltage, coupled through the first transformer, is passed through a half wave rectifier followed by an amplifier. The amplifier, of the direct current variety, permits a capcitor to be charged up acting as a timer. The capacitor upon being charged to a sufficient level, energizes a holding relay for a period of time of approximately 1½ minutes.

A series circuit, comprising a normally open contact of the holding relay and a normally closed contact of the alarm relay and the primary of the second transformer is hard wired across the telephone lines. Closure of the holding relay contact, in combination with the closed alarm relay, closed only when the burglar alarm has been tripped allows the primary of the second transformer to bridge the telephone lines for the period of time the holding relay contact is closed. Therefore, an incoming ring signal may only seize the line for a predetermined period of time when and only when the alarm apparatus has been previously triggered and has not been reset.

After the telephone line has been answered automatically by the apparatus, an authorized person introduces one or more decoding tones into the telephone lines. Conventional well known circuits may be utilized to decode multiple digit codes of multifrequencies, commonly used in certain telephone apparatus. The second transformer couples the coded alternating current signal into a decoding amplifier. The amplified signal is fed into a tuning fork assembly and thence into a diode detector so as to charge up a following capacitor. Therefore, the voltage across the capacitor goes into a logic high condition upon the presence of a successfully introduced coding tone. The output voltage from the capacitor is fed into a four input nand gate. Any unused leads of the nand gate are pulled in the direction of a high voltage condition by a resistor connected to the input of the gate. A PNP transistor has its collector and emitter connected across the normally opened latching up contact of the alarm relay. The base of the transistor is connected to one end of a resistor. The other end of the resistor is connected to the juncture of the output of the nand gate, one end of a load resistor, whose other end is connected to a power supply terminal, and the input of an inverting circuit. When the transistor is turned on, a path is prepared for the reclosure of the alarm relay when and only when open portions of the alarm sensing circuit are properly bridged.

The instant invention may be used in conjunction with a burglar alarm system utilizing a plurality of sensing switches whose number is virtually unlimited. The embodiment described and illustrated herein utilizes three such sensing switches. All of the logic circuitry employed is grouped on modular logic boards, wherein each board has the capability of sensing three open circuit paths and bridging the same as required. The logic boards are arranged in sequential fashion so as to permit an unlimited number of sensing elements to be utilized therewith.

The wires connected to the alarm sensing elements operate logic generators, wherein the number of logic generators equals the number of sensing elements associated therewith. Each of the three logic generators produces an output signal, signifying the open circuited condition of the associated alarm sensing element, and the first and second logic generators, utilizing inverting circuits, produce an output signal signifying the closure of such an associated switch. Such closure signifying output signals are fed to three latching circuits having an inverting circuit. The first inverting latching circuit is adapted to receive the "open" output latching signal from each of the three logic generators into a first four input nand gate from each of the three logic generators. The second inverting latching circuit is adapted to receive the "open" output latching signals of the second and third logic generators and the closed output signal from the first logic generator, into another four input nand gate. The third inverting latching circuit is adapted to receive the "open" output signal of the third logic generator and the not open output signals from the first and second logic generators into still another four input nand gate.

The three nand gates, operated as part of the inverting latching circuits have their fourth input gate terminals tied together and connected to the other end of the inverting circuit operated by the output terminal of the four input nand gate that is activated by the tone detector and capacitor circuit. Thus, the logic generators provide output signals, of the "open" and "closed" or not variety so as to turn on one of the three operating nand gates.

The following truth table illustrates the relationship between the logic output signals, the status of open switches, and the energization of the individual operating relays, derived from the logic circuitry employed herein;

|  | APPEARANCE OF SIGNAL: |  |  |  |  | ENERGIZED |
|---|---|---|---|---|---|---|
|  | a | b | c | a' | b' | Relay |
| SWITCH 1 OPEN | HI | HI | HI | LO | LO | K1 |
| SWITCH 2 OPEN | LO | HI | HI | HI | LO | K2 |
| SWITCH 3 OPEN | LO | LO | HI | HI | HI | K3 |

The output of each of the three nand gates utilizes a conventional latching circuit in combination with a separate sensing element bridging relay. When an operating nand gate is turned on, the bridging relay associated therewith is energized, and remains energized until the power source is removed, causing the normally open contact thereof to bridge the open circuited sensing element and, utilizing an auxiliary pair of contacts, to energize a light emitting diode, suitably identifying the portion of the circuit bridged by the relay causing the energization thereof.

As soon as all the logic conditions have been met, the bridged sensing element, in combination with the low impedance of the P N P transistor across the normally open contact of the alarm relay, causes the alarm relay coil to be re-energized, turning off the burglar alarm signalling apparatus and restoring the burglar alarm with continued protection. All the functions of the original burglar alarm apparatus is restored excepting those open sensing elements bridged by the contact closure of the individual sensing bridging relays. Furthermore, when the alarm relay has been re-energized, the telephone line seizure circuit involving the primary of the second transformer is open circuited affecting a disconnect to the telephone lines. The authorized person may, if desired, institute a verifying call, at any later point in time, to verify the status of the burglar alarm which, when operable, prevents a subsequent line seizure.

Further, alarm failures due to additional unauthorized entries or additional equipment failure, can be corrected by a subsequent placing of a telephone call in which the identical coded tones are utilized to operate the logic circuitry, causing a bridging of further open circuited sensing elements.

Now referring to the embodiment illustrated in FIG. 1, telephone lines 10 and 12 are connected in series with the primary of transformer 14 and neon bulb 16. A diode 18 feeds the input of amplifier 20, whose output is electrically connected to timer 22. Relay coil 24 operates for a period of time determined by timer 22, when a 20$H_z$ ring signal is present at terminals 10 and 12 after being amplified by amplifier 20. Contacts 26 close and, providing that alarm relay contacts 28 are closed, the primary of transformer 30 appears across terminals 10 and 12 causing the telephone lines to be seized. Incoming coding tones, introduced at terminals 10 and 12, are amplified by decoding amplifier 32. Tuning fork 34 responsive to the incoming coding signals, provides an output signal at wire 36 so that detector 38 may provide a charging signal for capacitor 40. When capacitor 40 achieves a maximum voltage level, four terminal nand gate 42 is turned on, causing resistor 44 to operate P N P transistor 46 due to the potential available from point 48 producing a current passing through operating relay coil 50, in conjunction with the internal impedence of the transistor. Capacitor 40 continues to maintain the transistor in a turned on condition until discharged or until the incoming tone signal fails to maintain capacitor 40 charged or until timer 22 causes the de-energization or coil 24. Nand gate 42 must enable alarm sensing elements 52, 54 and 56, when opened, to be closed before nand gate 42 is turned off. Wires 58, 60, 62 and 64 serve to indicate the status of sensing switch elements 52, 54, and 56 and to bridge any one or more of them as they become open circuited by utilizing operating relay contacts 66, 68, and 70. The voltage present at wires 58, 60 and 62, equal to the voltage at point 48 or equal to ground potential, due to normally closed contact 72 of the alarm relay, is utilized to operate logic generators 74 or 76 or 78, as a function of which sensing element of the group including elements 52, 54, and 56 is in an open circuited position. Dotted lines 80 symbolize the unlimited extent in which additional sensing elements, bridging relay contacts, and logic generators may be utilized in burglar alarm apparatus having more than three sensing elements.

Logic generators 74, 76 and 78 are selectively operated dependent upon which sensing element is in an open circuited condition. Logic generator 78 produces an output voltage identified as c, when sensing element 56 is open. Logic generator 76 produces an output voltage identified as the numeral b, when sensing element 54 is open and a logic signal identified as b, when sensing element 54 is closed. Logic generator 74 produces an output voltage identified as a, when sensing element 52 is open and a logic signal identified as a when sensing element 52 is closed. Three additional four terminal nand gates, not shown, are utilized in inverting latching circuits 82, 84, and 86. All of the inverting latching circuits cease to be inhibited when nand gate 42 is turned on, and the voltage available at its output terminal is inverted by invertor 88 and fed to line 90, feeding inverting latching circuits 82, 84, and 86. The remaining three input terminals for the nand gates of inverting latching circuits 82, 84, and 86 are fed with the logic voltage signals identified by numerals a, b, c, a', and b' as shown. Bridging relay coil 92 operates contacts 70. Bridging relay coil 94 operates contacts 68. Bridging relay coil 96 operates contacts 66. When inverting latching circuit 86 is operated by proper logic voltage signals injected into the four terminal nand gate three-within, not shown, bridging relay coil 92 is latched up into an energized state, causing contacts 70 to close when and only when sensing element 56 and wire 98, located intermediate point 100 and point 102, and wire 104, located intermediate point 106 and point 108, is open circuited. Thus, contacts 70, upon closure, bridge all the elements between points 102 and 106. Though sensing element 56 is depicted as a single switch device, points 102 and 106 may be electrically interconnected by a series circuit comprising a plurality of wires and a plurality of sensing elements including tape strips, photo-electric detecting devices, pressure sensitive mat switches, and the like.

When the series circuit between point 48 and point 102 is closed by the operation of bridging contacts 66, 68, or 70, as required, the current flowing through transistor 46 is no longer required to maintain alarm relay coil 50 energized due to the current now flowing through now closed alarm relay contacts 110, emanating from point 48.

Simultaneously with the energization of any of the bridging relay coils 92 or 94 or 96, bridging relay contacts 112, 114, and 116, associated therewith respectively, close and energize light emitting diodes 118, 120, and 122 respectively, from a voltage obtained across points 124 and 126. An energized light emitting diode signifies, by proper labeling, which bridging relay has been energized and thereby denotes the location of the fault or otherwise opened portion of the series circuit between points 48 and 102. Because inverting latching circuits 82, 84, and 86, when operated, latch up associated bridging relay coils 96, 94 and 92, light emitting diodes 118, 120, and 122, when individually energized, indicates such fault locations to authorized personnel arriving at the site of the burglar alarm after the burglar alarm has been reset into an operating condition by prior operation of the instant invention.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

I claim:

1. In a burglar alarm apparatus having a series circuit including a plurality of switch sensing elements and an electrical device energized when said plurality of switch sensing elements are in a closed condition, and a pair of wires utilized in a telephone communication system, the improvement comprising:
    a. first means responsive to a ringing signal transmitted over said pair of wires for energizing a first relay for a predetermined time period,
    b. second means responsive when said first relay is energized only to a coded tone signal transmitted over said pair of wires for producing an enabling voltage, said enabling voltages being produced only after said electrical device is de-energized,
    c. third means for detecting the position of each of said plurality of switch sensing elements,
    d. fourth means for initially applying a bridging short circuit across those of said plurality of switch sensing elements which are open circuited when said open circuited condition and said enabling voltage occur simultaneously,
    e. fifth means for indicating the location of said open circuited condition, and
    f. sixth means for maintaining said bridging short circuit after said enabling voltage is reduced to zero.

2. The improvement as claimed in claim 1 wherein said first means comprises a neon bulb, a first transformer, a diode, a first amplifier, a timer, the primary of said first transformer in a series circuit with said neon bulb disposed in a parallel electrical circuit with said pair of wires, the secondary of said first transformer in a series circuit with said diode and the input terminals of said first amplifier, said first amplifier initiating the energization of said timer upon the appearance of said ringing tone at said input terminals, said first relay energized for said predetermined time period after initiating said energization of said timer.

3. The improvement as claimed in claim 1 wherein said second means comprises a second transformer, a second amplifier, coded tone signal discriminating means, a capacitor, a series circuit of the primary of said second transformer and a normally open contact of said first relay connected in parallel with said pair of wires, the secondary of said second transformer connected to the input terminals of said second amplifier, the output terminals of said second amplifier connected to the input terminals of said coded tone signal discriminating means, the output terminals of said coded tone signal discriminating means providing a charging voltage to said capacitor when said coded tone signal successfully operates said coded tone signal discriminating means producing said enabling voltage across said capacitor.

4. The improvement as claimed in claim 1 wherein said third means comprises a plurality of solid state devices responsive to said open circuited condition of said each of said plurality of switch sensing elements.

5. The improvement as claimed in claim 4 wherein said fourth means comprises a plurality of operating relays, a logic circuit, each of said plurality of operating relays having a normally open contact, each of said plurality of switch sensing elements having one of said normally open contacts of said each of said plurality of operating relays in parallel therewith, the coil of one of said plurality of operating relays selectively energized when a corresponding one of said plurality of switch sensing elements is operated into said open circuited condition and thereby operates said logic circuit.

6. The improvement as claimed in claim 5 wherein said fifth means comprises a plurality of light emitting diodes, one of said plurality of light emitting diodes energized when said one of said plurality of operating relays is energized.

7. The improvement as claimed in claim 5 wherein said sixth means comprises a latching circuit for electrically continuously latching said one of said plurality of operating relays into an energized condition at the initial energization thereof.

* * * * *